United States Patent
Habel et al.

(10) Patent No.: US 12,347,347 B2
(45) Date of Patent: Jul. 1, 2025

(54) COLOR CORRECTION PIPELINE

(71) Applicant: Apple Inc., Cupertino, CA (US)

(72) Inventors: Ralf Habel, Cupertino, CA (US); Shuang Wang, Palo Alto, CA (US); Yue Ma, Sunnyvale, CA (US); Sivalogeswaran Ratnasingam, San Jose, CA (US); Anselm Grundhoefer, Campbell, CA (US)

(73) Assignee: APPLE INC., Cupertino, CA (US)

( * ) Notice: Subject to any disclaimer, the term of this patent is extended or adjusted under 35 U.S.C. 154(b) by 76 days.

(21) Appl. No.: 18/011,065

(22) PCT Filed: Jun. 7, 2021

(86) PCT No.: PCT/US2021/036139
§ 371 (c)(1),
(2) Date: Dec. 16, 2022

(87) PCT Pub. No.: WO2021/257304
PCT Pub. Date: Dec. 23, 2021

(65) Prior Publication Data
US 2023/0267860 A1    Aug. 24, 2023

Related U.S. Application Data

(60) Provisional application No. 63/041,276, filed on Jun. 19, 2020.

(51) Int. Cl.
*G09G 3/00*    (2006.01)
(52) U.S. Cl.
CPC ..... *G09G 3/001* (2013.01); *G09G 2320/0242* (2013.01); *G09G 2360/144* (2013.01)
(58) Field of Classification Search
None
See application file for complete search history.

(56) References Cited

U.S. PATENT DOCUMENTS

2013/0335404 A1* 12/2013 Westerinen ............. G06F 3/033
                                                      345/158
2016/0210934 A1   7/2016 Halfman et al.
(Continued)

FOREIGN PATENT DOCUMENTS

WO    2016183681 A1    11/2016

OTHER PUBLICATIONS

PCT International Search Report and Written Opinion dated Sep. 28, 2021, PCT International Application No. PCT/US2021/036139, pp. 1-11.

*Primary Examiner* — Frank S Chen
(74) *Attorney, Agent, or Firm* — Fernando & Partners, LLP; Allen J. Oh (57) ABSTRACT

In accordance with some implementations, a method is performed at an electronic device with one or more processors, a non-transitory memory, and a see-through display. The method includes determining a plurality of light superposition characteristic values associated with ambient light from a physical environment. The plurality of light superposition characteristic values quantifies the ambient light. The method includes modifying image data in order to generate modified image data, based on a function of the plurality of light superposition characteristic values and a reference perceptual gamut. The method includes transforming the modified image data into display data based on a function of a portion of the plurality of light superposition characteristic values and a reference physical gamut that is associated with the see-through display. The method includes displaying the display data on the see-through display.

19 Claims, 7 Drawing Sheets

(56) References Cited

U.S. PATENT DOCUMENTS

2018/0268754 A1\* 9/2018 Kim .................... G09G 3/2011
2020/0105225 A1 4/2020 Greenebaum et al.

\* cited by examiner

COLOR CORRECTION PIPELINE

CROSS REFERENCE TO RELATED APPLICATIONS

This application claims priority to PCT application number PCT/US21/36139, filed on Jun. 7, 2021 which claims priority to U.S. patent application No. 63/041,276, filed on Jun. 19, 2020, which are hereby incorporated by reference in their entirety.

TECHNICAL FIELD

The present disclosure relates to color correction, and in particular, performing color correction based on light characteristics associated with a physical environment.

BACKGROUND

In some augmented reality (AR) environments, computer-generated content is added to light from a physical environment in order to enable display of the computer-generated content and a representation of the physical environment. A user may experience AR with an electronic device that includes a see-through display, which, in turn, allows the light from the physical environment to pass to eyes of the user.

In some circumstances, however, light from the physical environment has a luminance or a chromaticity that interferes with computer-generated content in a manner that degrades the AR experience. For example, light from the physical environment results in displayed computer-generated content having a distorted perceived contrast level or an incorrect color profile. However, previously available color correction methods do not effectively account for light from the physical environment.

SUMMARY

In accordance with some implementations, a method is performed at an electronic device with one or more processors, a non-transitory memory, and a see-through display. The method includes determining a plurality of light superposition characteristic values associated with ambient light from a physical environment. The plurality of light superposition characteristic values quantifies the ambient light. The method includes modifying image data in order to generate modified image data, based on a function of the plurality of light superposition characteristic values and a reference perceptual gamut. The method includes transforming the modified image data into display data based on a function of a portion of the plurality of light superposition characteristic values and a reference physical gamut that is associated with the see-through display. The method includes displaying the display data on the see-through display.

In accordance with some implementations, an electronic device includes one or more processors, a non-transitory memory, and a see-through display. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

SUMMARY

A user may experience augmented reality (AR) via an electronic device (e.g., a tablet or smartphone) that includes a see-through display, which, in turn, allows light from the physical environment to pass to eyes of the user. For example, the see-through display projects computer-generated content to be reflected off of the see-through display to the user's eyes. As another example, the see-through display projects computer-generated content directly at retinas of the user, and the light from the physical environment and the projected light of the computer-generated content concurrently reach the retinas. However, the electronic device cannot effectively perform color correction because the electronic device does not account for light from the physical environment. For example, the electronic device does not account for the intensity of the light (e.g., the luminance), which may vary over time. The luminance of the light from the physical environment may limit the level of contrast between the physical environment and displayed computer-generated content. As another example, light from the physical environment may have a chromaticity that interferes with computer-generated content in a manner that degrades the AR experience. The chromaticity of the light, such as the presence of predominantly one color, may provide dominant hues that are difficult to mask. The dominant hues associated with the light from the physical environment may interfere with the color characteristics of displayed computer-generated content. Moreover, certain color correction methods that are used in pass-through video display systems, such as backlight tinting, are not applicable to the electronic device with the see-through display. Additionally, applying previously available tone mapping is not effective because it does not account for luminance and chromaticity features associated with light from a physical environment.

By contrast, various implementations disclosed herein provide a color correction pipeline for modifying image data based on light superposition characteristics, a reference perceptual gamut, and a reference physical gamut. The reference physical gamut is associated with a see-through display on which display data is displayed. Modifying the image data based on characteristics of the ambient light enables the see-through display to display computer-generated that is less adversely affected by the ambient light, as compared with other color correction systems. Thus, the user-experience (e.g., AR experience) is enhanced, as compared with the other color correction systems.

To that end, in some implementations, an electronic device with a see-through display determines light superposition characteristic values, which are associated with ambient light from a physical environment. In some implementations, the electronic device includes an environmental sensor (e.g., an ambient light sensor and/or an image sensor), and utilizes environmental data from the environmental sensor in order to determine the light superposition characteristic values. In some implementations, the light superposition characteristic values include a combination of luminance values and chromaticity values (e.g., chroma, hue, saturation) associated with the ambient light.

Moreover, the electronic device modifies image data in order to generate modified image data, based on the light superposition characteristics and a reference perceptual gamut. The reference perceptual gamut may be a function of a reference physical gamut associated with the see-through display. For example, the reference physical gamut indicates a range of colors displayable by the see-through display, and the reference perceptual gamut indicates a subset of the range of colors that are perceptible by a user. In some implementations, the reference physical gamut is characterized by an ideal or near-ideal environmental condition, such as a black or near-black physical environment in which only a nominal amount of ambient light enters the see-through display. Accordingly, in contrast to other systems that perform uniform spatial mapping, the electronic device accounts for changes to characteristics of ambient light entering the see-through display. Thus, the modified image data has enhanced color and luminance features, such as having a larger high-dynamic range (HDR), an exact contrast reproduction and an improved chromaticity reproduction.

The electronic device transforms the modified image data into display data based on a function of a portion of the light superposition characteristic values and the reference physical gamut. Accordingly, in contrast to other systems that perform three-dimensional gamut mapping (e.g., RGB-to-RGB mapping), the electronic device may perform at least four-dimensional gamut mapping because it also accounts for chromaticity characteristics (e.g., three dimensions), a luminance value (one dimension) associated with the ambient light, and/or AR display colors (e.g., three dimensions).

Description

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

Various examples of electronic systems and techniques for using such systems in relation to various computer-generated reality technologies are described.

A physical environment refers to a physical world that someone may interact with and/or sense without the use of electronic devices. The physical environment may include physical features such as a physical object or physical surface. For example, a physical environment may include a physical city that includes physical buildings, physical streets, physical trees, and physical people. People may directly interact with and/or sense the physical environment through, for example, touch, sight, taste, hearing, and smell. An extended reality (XR) environment, on the other hand, refers to a wholly or partially simulated environment that someone may interact with and/or sense using an electronic device. For example, an XR environment may include virtual reality (VR) content, augmented reality (AR) content, mixed reality (MR) content, or the like. Using an XR system, a portion of a person's physical motions, or representations thereof, may be tracked. In response, one or more characteristics of a virtual object simulated in the XR environment may be adjusted such that it adheres to one or more laws of physics. For example, the XR system may detect a user's movement and, in response, adjust graphical and auditory content presented to the user in a way similar to how views and sounds would change in a physical environment. In another example, the XR system may detect movement of an electronic device presenting an XR environment (e.g., a laptop, a mobile phone, a tablet, or the like) and, in response, adjust graphical and auditory content presented to the user in a way similar to how views and sounds would change in a physical environment. In some situations, the XR system may adjust one or more characteristics of graphical content in the XR environment responsive to a representation of a physical motion (e.g., a vocal command).

Various electronic systems enable one to interact with and/or sense XR environments. For example, projection-based systems, head-mountable systems, heads-up displays (HUDs), windows having integrated displays, vehicle windshields having integrated displays, displays designed to be placed on a user's eyes (e.g., similar to contact lenses), speaker arrays, headphones/earphones, input systems (e.g., wearable or handheld controllers with or without haptic feedback), tablets, smartphones, and desktop/laptop computers may be used. A head-mountable system may include an integrated opaque display and one or more speakers. In other examples, a head-mountable system may accept an external device having an opaque display (e.g., a smartphone). The head-mountable system may include one or more image sensors and/or one or more microphones to capture images or video and/or audio of the physical environment. In other examples, a head-mountable system may include a transparent or translucent display. A medium through which light representative of images is directed may be included within the transparent or translucent display. The display may utilize OLEDs, LEDs, uLEDs, digital light projection, laser scanning light source, liquid crystal on silicon, or any combination of these technologies. The medium may be a hologram medium, an optical combiner, an optical waveguide, an optical reflector, or a combination thereof. In some examples, the transparent or translucent display may be configured to selectively become opaque. Projection-based systems may use retinal projection technology to project graphical images onto a user's retina. Projection systems may also be configured to project virtual objects into the physical environment, for example, on a physical surface or as a hologram.

Figure 1:
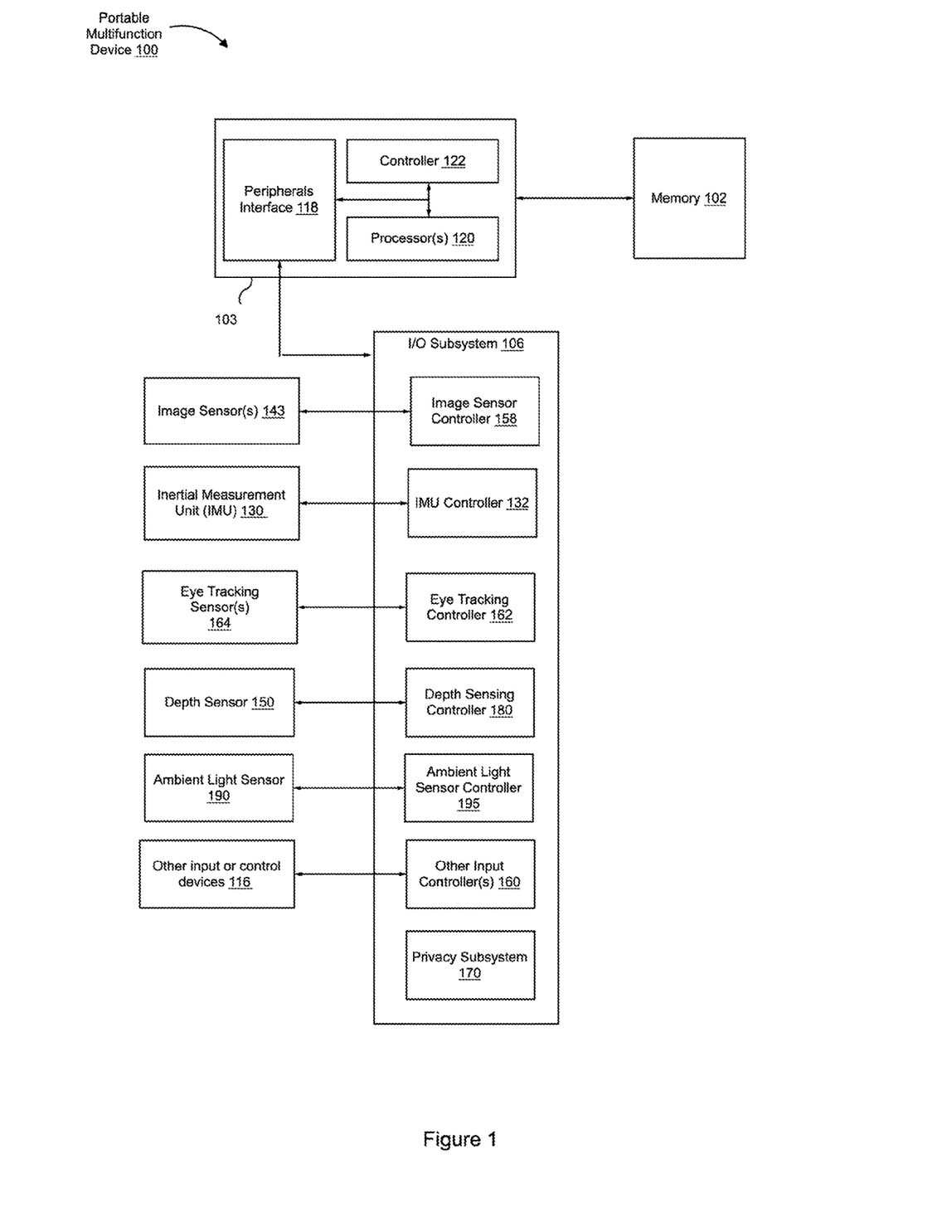
FIG. 1 is a block diagram of an example of a portable multifunction device in accordance with some implementations.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, an inertial measurement unit (IMU) 130, image sensor(s) 143 (e.g., a camera), a depth sensor 150, eye tracking sensor(s) 164, an ambient light sensor 190, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more CPUs 120, and the memory controller 122 are, optionally, implemented on a single chip, such as a chip 103. In some other implementations, they are, optionally, implemented on separate chips.

The I/O subsystem 106 couples input/output peripherals on the electronic device 100 and the other input or control devices 116 with the peripherals interface 118. The I/O subsystem 106 optionally includes an image sensor controller 158, an eye tracking controller 162, and one or more input controllers 160 for other input or control devices, and a privacy subsystem 170. The one or more input controllers 160 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 160 are, optionally, coupled with any (or none) of the following: a keyboard, infrared port, Universal Serial Bus (USB) port, stylus, and/or a pointer device such as a mouse. The one or more buttons optionally include an up/down button for volume control of a speaker and/or audio sensor(s). The one or more buttons optionally include a push button. In some implementations, the other input or control devices 116 includes a positional system (e.g., GPS) that obtains information concerning the location and/or orientation of the electronic device 100 relative to a physical environment.

The I/O subsystem 106 optionally includes a speaker and audio sensor(s) that provide an audio interface between a user and the electronic device 100. Audio circuitry receives audio data from the peripherals interface 118, converts the audio data to an electrical signal, and transmits the electrical signal to the speaker. The speaker converts the electrical signal to human-audible sound waves. Audio circuitry also receives electrical signals converted by an audio sensor (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The I/O subsystem 106 optionally includes a touch-sensitive display system that provides an input interface and an output interface between the electronic device 100 and a user. A display controller may receive and/or send electrical signals from/to the touch-sensitive display system. The touch-sensitive display system displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The touch-sensitive display system has a touch-sensitive surface, sensor, or set of sensors that accepts input from the user based on haptic and/or tactile contact. The touch-sensitive display system and the display controller (along with any associated modules and/or sets of instructions in the memory 102) detect contact (and any movement or breaking of the contact) on the touch-sensitive display system and converts the detected contact into interaction with user-interface objects (e.g., one or more soft keys, icons, web pages or images) that are displayed on the touch-sensitive display system. In an example implementation, a point of contact between the touch-sensitive display system and the user corresponds to a finger of the user or a stylus.

The touch-sensitive display system optionally uses LCD (liquid crystal display) technology, LPD (light emitting polymer display) technology, or LED (light emitting diode) technology, although other display technologies are used in other implementations. The touch-sensitive display system and the display controller optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system.

The user optionally makes contact with the touch-sensitive display system using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The I/O subsystem 106 includes the inertial measurement unit (IMU) 130 that may include accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like. The IMU may 130 include accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) 143 corresponds to one or more cameras. In some implementations, the image sensor(s) 143 includes one or more depth sensors. In some implementations, the image sensor(s) 143 includes a monochrome or color camera. In some implementations, the image sensor(s) 143 includes an RGB depth (RGB-D) sensor.

The I/O subsystem 106 optionally includes contact intensity sensors that detect intensity of contacts on the electronic device 100 (e.g., a touch input on a touch-sensitive surface of the electronic device 100). The contact intensity sensors may be coupled with an intensity sensor controller in the I/O subsystem 106. The contact intensity sensor(s) optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) receive contact intensity information (e.g., pressure information or a proxy for pressure information) from the physical environment. In some implementations, at least one contact intensity sensor is collocated with, or proximate to, a touch-sensitive surface of the electronic device 100. In some implementations, at least one contact intensity sensor is located on the back of the electronic device 100.

In some implementations, the depth sensor 150 is configured to obtain depth data, such as depth information characterizing an object within an obtained input image. For example, the depth sensor 150 corresponds to one of a structured light device, a time-of-flight device, and/or the like.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within an electronic device.

The ambient light sensor (ALS) 190 detects ambient light from the physical environment. In some implementations, the ambient light sensor 190 is a color light sensor. In some implementations, the ambient light sensor 190 is a two-dimensional (2D) or a three-dimensional (3D) light sensor.

In various implementations, the electronic device 100 includes a privacy subsystem 170 that includes one or more privacy setting filters associated with user information, such as user information included in the eye gaze data and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2:
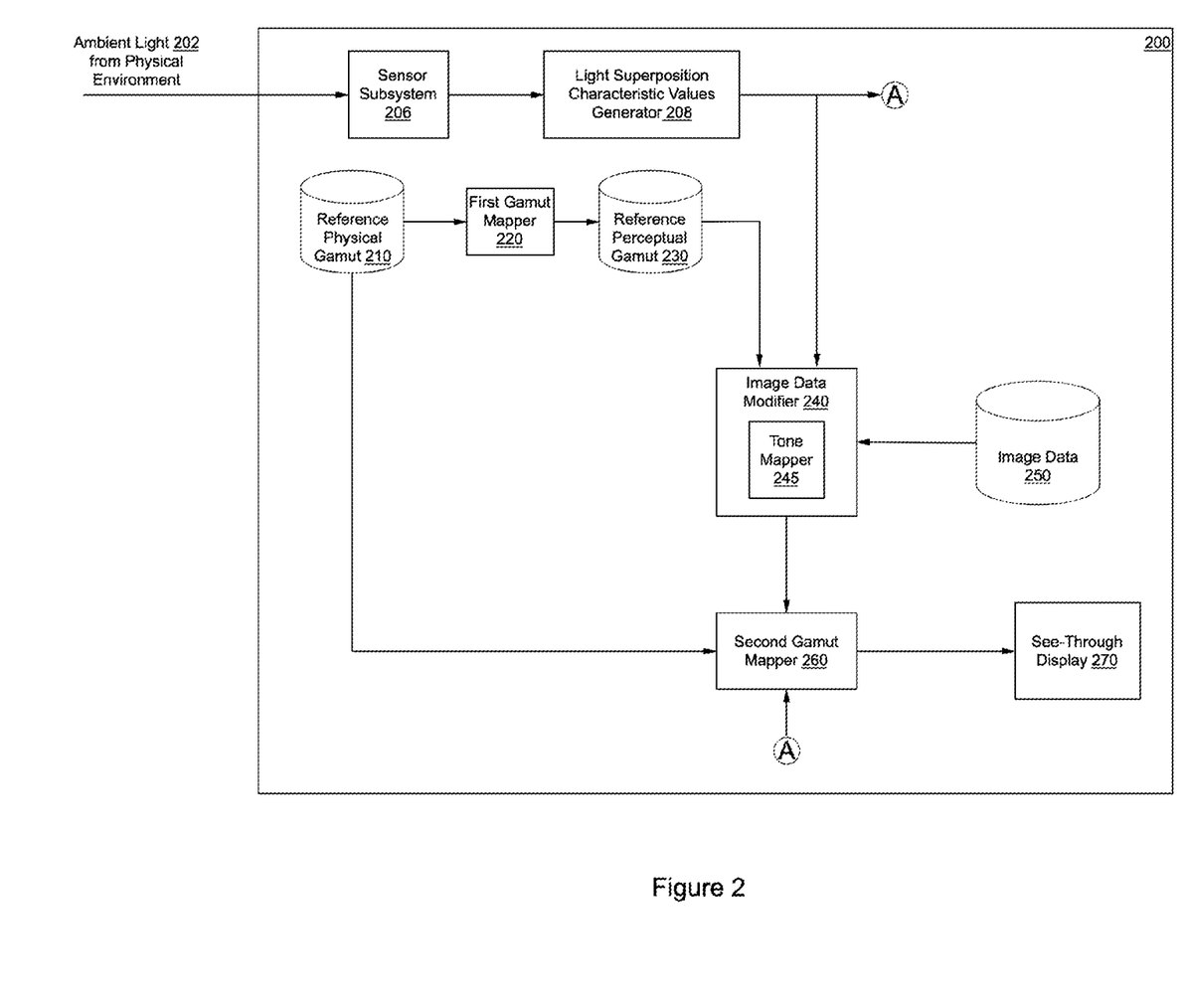
FIG. 2 is an example of a block diagram of a color correction pipeline in accordance with some implementations.

FIG. 2 is an example of a block diagram of a color correction pipeline 200 in accordance with some implementations. In various implementations, the color correction pipeline 200, or portions thereof, is integrated in an electronic device, such as the electronic device 100 illustrated in FIG. 1. In some implementations, the color correction pipeline 200 is integrated within one of a mobile device, such as a smartphone, tablet, laptop, wearable device, etc.

In some implementations, the color correction pipeline 200 is integrated in an electronic device including a see-through display 270. The see-through display 270 operates as an additive display by adding computer-generated content (e.g., extended reality (XR) content) to ambient light 202 from a physical environment.

In some implementations, the see-through display 270 corresponds to an additive display that enables optical see-through of the physical environment, such as an optical HMD (OHMD). For example, in contrast to pure compositing using a video stream, the additive display is capable of reflecting projected images off of the display while enabling the user to see through the display. In some implementations, the see-through display 270 displays at least a nominal amount of light from the physical environment. In some implementations, the see-through display 270 includes a photochromic lens or an electrochromic layer.

The color correction pipeline 200 includes a sensor subsystem 206 to sense the ambient light 202 and output corresponding sensor data. In some implementations, the sensor subsystem 206 includes a combination of environmental sensors, such as an ambient light sensor (ALS) (e.g., a two-dimensional (2D) sensor), an image sensor, and/or an inertial measurement unit (IMU). For example, in some implementations, the sensor subsystem 206 includes a monochrome or color camera with a depth sensor (RGB-D) and determines camera pose to point-of-view projection based on data from the RGB-D. As another example, in some implementations, the sensor subsystem 206 captures a lower resolution scene image, such as via a dedicated low-resolution image sensor or a dedicated high-resolution image sensor. In some implementations, the sensor subsystem 206 is implemented as a hardened IP block. In some implementations, the sensor subsystem 206 is implemented by using software and hardware accelerators.

In some implementations, the color correction pipeline 200 includes a light superposition characteristic values generator 208 to determine (e.g., generate) a plurality of a light superposition characteristic values based on the corresponding sensor data. The plurality of a light superposition characteristic values is associated with the ambient light 202 from the physical environment. The plurality of light superposition characteristic values quantifies the ambient light 202. For example, in some implementations, the plurality of light superposition characteristic values includes a combination of luminance values (e.g., brightness) and chromaticity values (e.g., saturation, hue, chroma) that characterize the ambient light 202.

The color correction pipeline 200 includes an image data modifier 240 that modifies image data in order to generate modified image data, based on a function of the plurality of light superposition characteristic values and a reference perceptual gamut. In some implementations, the image data is stored in an image data datastore 250. In some implementations, the reference perceptual gamut (e.g., stored in a reference perceptual gamut datastore 230) indicates a range of colors that is perceptible by a user. For example, the reference perceptual gamut is affected by factors such as the user's state of adaptation of the eye, size and contour sharpness, location on the retina, etc.

In some implementations, the modified image data satisfies a color contrast threshold with respect to the plurality of light superposition characteristic values. As one example, the image data represents a white ghost, and the plurality of light superposition characteristic values includes a green chromaticity value associated with the ambient light 202, such as when a see-through display of an electronic device is pointing towards trees in a forest. Continuing with the previous example, the image data modifier 240 modifies the white ghost so that the white ghost, when displayed on the see-through display 270, appears white and substantially without a greenish tint. Accordingly, the image data modifier 240 changes the color of the white ghost so as to counteract the green chromaticity associated with the ambient light 202. In some implementations, the image data modifier 240 includes a tone mapper 245 that performs a tone mapping operation with respect to the image data. For example, the tone mapper 245 applies a tone mapping operation to a face in order to achieve a substantially uniform skin tone.

In some implementations, the modified image data satisfies a luminance contrast threshold with respect to the plurality of light superposition characteristic values. For example, the image data represents a white ghost and the plurality of light superposition characteristic values includes a relatively high luminance level, such as when an electronic device is pointing towards the Sun. Continuing with the previous example, the image data modifier 240 modifies the white ghost, such as by darkening or tinting a portion of the image data representing the white ghost, in order to counteract the relatively high brightness of the Sun.

In some implementation, the color correction pipeline 200 includes a first gamut mapper 220 that maps (e.g., transforms) a reference physical gamut (e.g., stored in a reference physical gamut datastore 210) to the reference perceptual gamut. The reference physical gamut is associated with the see-through display 270. For example, the reference physical gamut is indicative of a luminance range or a color range that is displayable by the see-through display 270. As another example, the reference physical gamut characterizes the see-through display 270 as a nominal amount of the ambient light 202 enters the see-through display 270. In some implementations, the first gamut mapper 220 determines the reference perceptual gamut based on a function of the reference physical gamut and a color appearance model.

The color correction pipeline 200 includes a second gamut mapper 260. The second gamut mapper 260 receives the modified image data from the image data modifier 240. The second gamut mapper 260 transforms the modified image data into display data based on a function of a portion of the plurality of light superposition characteristic values and the reference physical gamut. For example, in some implementations, the second gamut mapper 260 transforms the modified image data based on a function of color characteristics (e.g., RGB-to-RGB mapping) of the modified image data and a combination of chromaticity values and luminance values included in the plurality of light superposition characteristic values. Accordingly, in some implementations, the second gamut mapper 260 performs a gamut mapping in four or more dimensions. The second gamut mapper 260 provides the display data for display on the see-through display 270.

Figure 3:
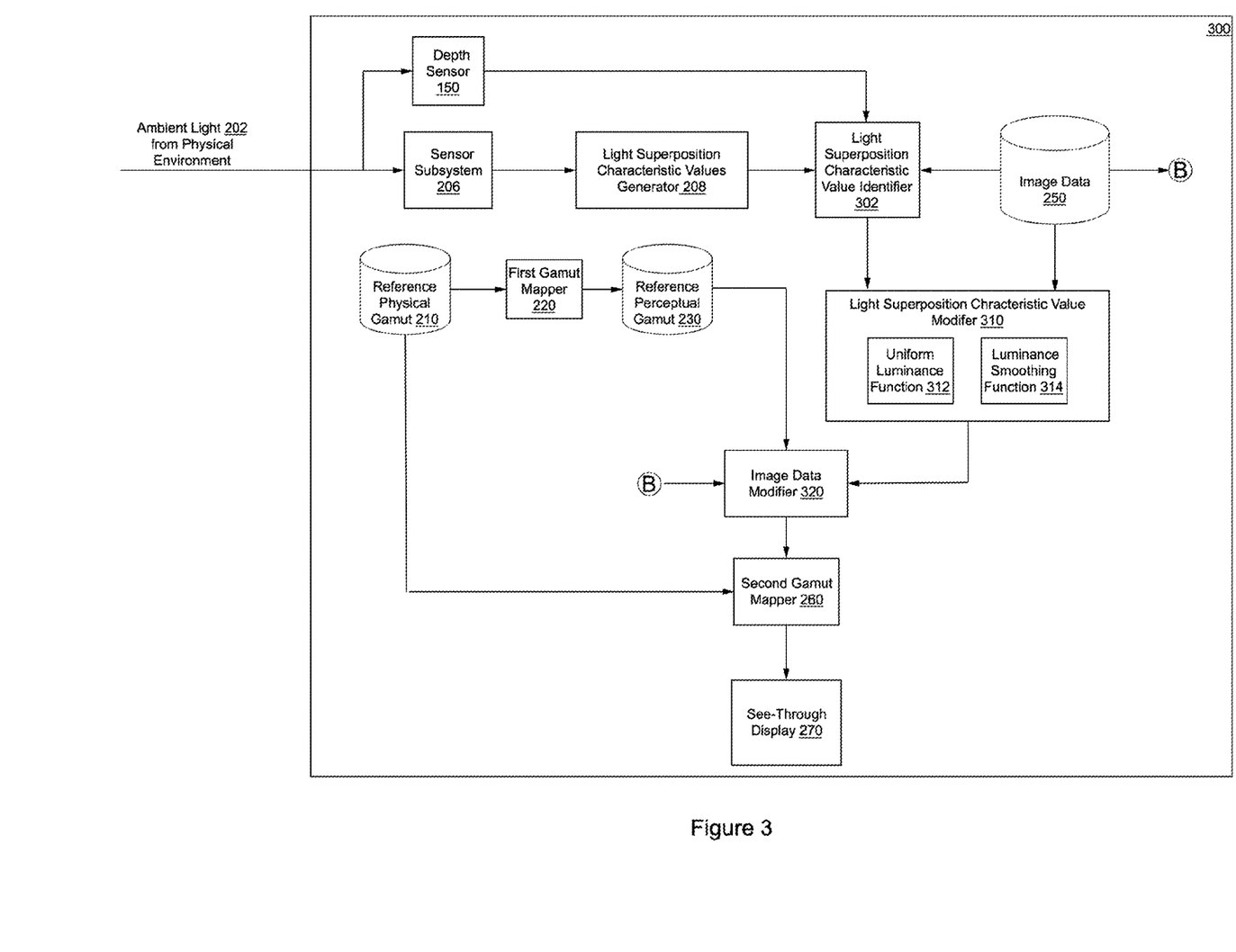
FIG. 3 is another example of a block diagram of a color correction pipeline in accordance with some implementations.

FIG. 3 is another example of a block diagram of a color correction pipeline 300 in accordance with some implementations. In various implementations, the color correction pipeline 300, or portions thereof, is integrated in an electronic device, such as the electronic device 100 illustrated in FIG. 1. In some implementations, the color correction pipeline 300 is similar to and adapted from the color correction pipeline 200 illustrated in FIG. 2.

The color correction pipeline 300 includes an image data modifier 320 that modifies image data based on one or more modified portions of a plurality of light superposition characteristic values. To that end, the color correction pipeline 300 includes a light superposition characteristic value identifier 302 that identifies respective portions of the plurality of light superposition characteristic values, across the see-though display 270, based on corresponding portions of the image data. The light superposition characteristic value identifier 302 obtains the plurality of light superposition characteristic values from the light superposition characteristic values generator 208. For example, in some implementations, the light superposition characteristic value identifier 302 identifies a first portion of the plurality of light superposition characteristic values associated with a first region of the see-through display 270. Continuing with the previous example, the first region of the see-through display 270 corresponds to a display location of a first portion of the image data 250 that represents an object of interest, such as text or a person's face. In some implementations, the color correction pipeline 300 includes the depth sensor 150, and the light superposition characteristic value identifier 302 uses depth sensor data from the depth sensor 150 in order to identify the respective portions of the plurality of light superposition characteristic values. For example, the light superposition characteristic value identifier 302 identifies a second portion of the plurality of light superposition characteristic values associated with a foreground of the physical environment, as is indicated by the depth sensor data.

The color correction pipeline 300 includes a light superposition characteristic value modifier 310 that obtains the portions of the plurality of light superposition characteristic values from the light superposition characteristic value identifier 302. The light superposition characteristic value modifier 310 modifies one or more of the respective portions of the plurality of light superposition characteristic values based on a function of predetermined display characteristics associated with the image data in order to generate one or more modified portions of the plurality of light superposition characteristic values. For example, the predetermined display characteristics include a combination of preferred chromaticity and lightness values associated with the image data. In some implementations, the light superposition characteristic value modifier 310 applies a uniform luminance function 312 to the one or more of the respective portions of the plurality of light superposition characteristic values. For example, when a portion of the image data represents a face, the corresponding region will be reproduced with a substantially uniform skin tone. In some implementations, the light superposition characteristic value modifier 310 applies a luminance smoothing function 314 to the one or more of the respective portions of the plurality of light superposition characteristic values. For example, the luminance smoothing function 314 implements Gaussian smoothing, uniform moving average smoothing, and/or the like. The light superposition characteristic value modifier 310 provides the one or more modified portions of the plurality of light superposition characteristic values to an image data modifier 320.

The image data modifier 320 modifies the image data based on a function of the one or more modified portions of the plurality of light superposition characteristic values and a reference perceptual gamut, such as described with reference to the image data modifier 240 in FIG. 2. The image data modifier 320 provides the modified image data to the second gamut mapper 260. The second gamut mapper 260 transforms the modified image data into display data for display on the see-through display 270, such as described with reference to FIG. 2.

Figure 4:
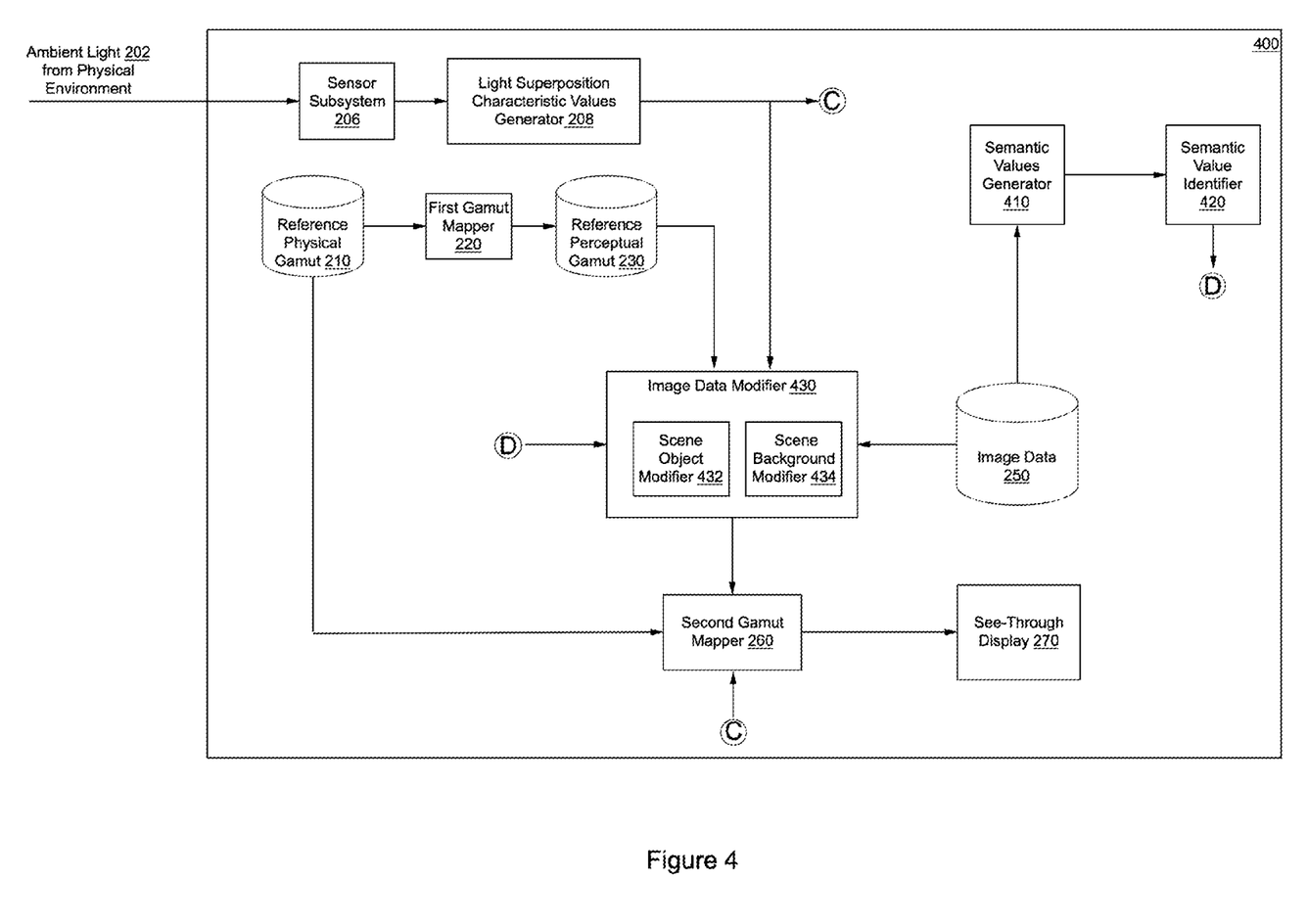
FIG. 4 is an example of a block diagram of a semantic-based color correction pipeline in accordance with some implementations.

FIG. 4 is an example of a block diagram of a semantic-based color correction pipeline 400 in accordance with some implementations. In various implementations, the semantic-based color correction pipeline 400, or portions thereof, is integrated in an electronic device, such as the electronic device 100 illustrated in FIG. 1. In some implementations, the semantic-based color correction pipeline 400 is similar to and adapted from the color correction pipeline 200 illustrated in FIG. 2 or the color correction pipeline 300 illustrated in FIG. 3.

The semantic-based color correction pipeline 400 selectively modifies image data based on a function of corresponding semantic values. For example, in some implementations, the semantic-based color correction pipeline 400 modifies a first portion of the image data that is associated with a first semantic value satisfying a criterion. For example, the first semantic value is associated with an object of interest, such as a "face" of a person or a "painting." As another example, the first semantic value corresponds to a particular object type, such as a living object (e.g., a person, animal, tree, etc.).

To that end, the semantic-based color correction pipeline 400 includes a semantic values generator 410 that obtains or generates a plurality of semantic values respectively associated with a plurality of portions of the image data. For example, in some implementations, the semantic values generator 410 obtains the plurality of semantic values from another system, such as from the internet. As another example, in some implementations, the semantic values generator 410 generates the plurality of semantic values by performing semantic segmentations with respect to the image data. In some implementations, the semantic values generator 410 generates the plurality of semantic values with the aid of a neural network that is integrated within the semantic-based color correction pipeline 400.

Moreover, the semantic-based color correction pipeline 400 includes a semantic value identifier 420 that obtains the plurality of semantic values from the semantic values generator 410. The semantic-based color correction pipeline 400 identifies, from the plurality of semantic values, the first semantic value satisfying the criterion. The semantic value identifier 420 provides the first semantic value to an image data modifier 430.

The image data modifier 430 modifies the image data in order to generate modified image data, similar to as described with reference to the image data modifier 240 in FIG. 2 or the image data modifier 320 in FIG. 3. In some implementations, the image data modifier 240 modifies the image data based on a function of predetermined display characteristics associated with the first portion of the image data associated with the first semantic value. For example, the predetermined display characteristics include a combination of chromaticity and lightness values. In some implementations, the image data modifier 430 applies a scene object modifier 432 to the first portion of the image data in order to emphasize the identified object of interest. For example, the scene object modifier 432 increases a color contrast or luminance contrast between the first portion of the image data and the plurality of light superposition characteristic values. In some implementations, the image data modifier 430 applies a scene background modifier 434 to portions of the image data that are outside of the first portion of the image data in order to de-emphasize the scene background. In some implementations, the image data modifier 430 performs both an object emphasis operation and a background de-emphasis operation with respect to the image data.

The image data modifier 430 provides the modified image data to the second gamut mapper 260. The second gamut mapper 260 transforms the modified image data into display data for display on the see-through display 270, such as described with reference to FIG. 2.

Figure 5:
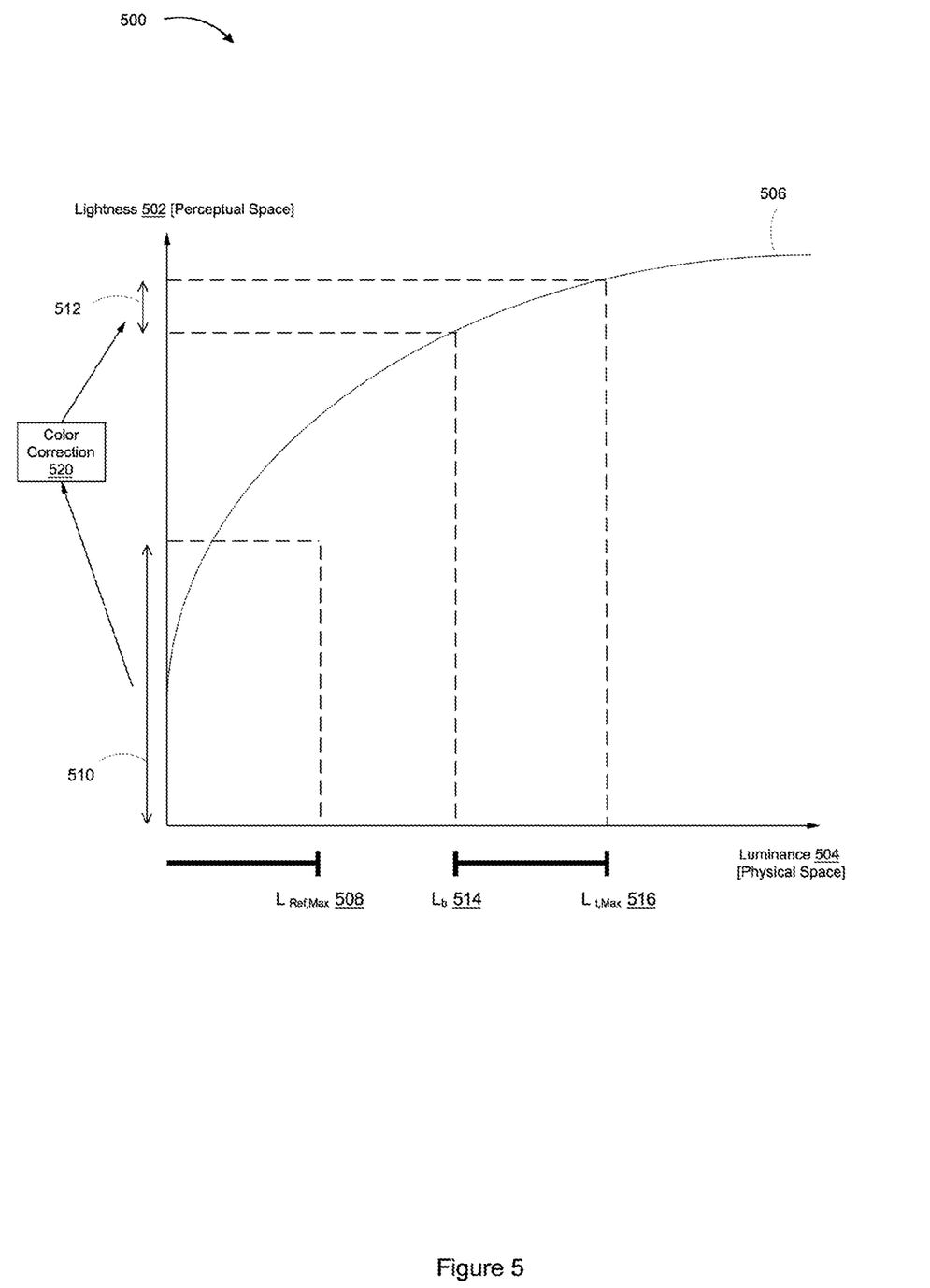
FIG. 5 is an example of a graphical representation of color correction in accordance with some implementations.

FIG. 5 is an example of a graphical representation 500 of color correction in accordance with some implementations. The graphical representation 500 represents a relationship between luminance 504 (on the x-axis) and lightness 502 (on the y-axis). The luminance 504 is associated with ambient light from a physical environment, such as the ambient light 202 described with reference to FIGS. 2-4. The lightness 502 is associated with a perceptual space associated with a user's perception of light. The graphical representation 500 corresponds to a logarithmic curve 506 illustrating a perceptual color space mapping between physical luminance values (x-axis) and perceptual lightness values (y-axis). In other words, the graphical representation 500 represents a color correction as a function of luminance values associated with a physical environment (e.g., achromatic). However, one of ordinary skill in the art will appreciate that, in some implementations, color correction is additionally or alternatively a function of chromaticity. For example, as described above, color correction may be a function of chromaticity associated with image data, and chromaticity values included in the plurality of light superposition characteristic values associated with ambient light.

The values on the x-axis ranging from zero-to-$L_{Ref,Max}$ 508 correspond to a luminance range associated with the physical space before color correction occurs. For example, $L_{Ref,Max}$ 508 indicates a maximum luminance of a reference physical gamut associated with a see-through display, such as the reference physical gamut 210 illustrated in FIGS. 2-4. Moreover, the values of y-axis including a first range 510 correspond to a lightness range associated with the perceptual space before color correction occurs.

In order to restore the originally intended contrast relations, various implementations disclosed herein provide a color correction 520. The color correction 520 generates, from image data, display data based on light superposition characteristics, a reference perceptual gamut (e.g., the reference perceptual gamut 230 in FIGS. 2-4), and a reference physical gamut (e.g., the reference physical gamut 210 in FIGS. 2-4). According to various implementations, the color correction 520 is implemented by one of the color correction pipeline 200 in FIG. 2, the color correction pipeline 300 in FIG. 3, or the semantic-based color correction pipeline 400 in FIG. 4. In some implementations, the color correction 520 includes performing a contrast recovery tone mapping with respect to the image data based on determined light superposition characteristic values associated with ambient light from a physical environment. To that end, the color correction 520 recovers dynamic loss between the reference perceptual gamut and the reference physical gamut. In some implementations, the color correction 520 includes a 4+ dimensional gamut transformation. For example, the color correction 520 includes a 7-dimensional gamut mapping, including three-dimensions associated with mapping image data to a see-through display (e.g., RGB-to-RGB), three-dimensions associated with chromaticity values (e.g., two dimensions) associated with ambient light, and another dimension associated with luminance values associated with the ambient light.

Based on the color correction 520, the lightness values are extended from the first range 510 to a second range 512, as illustrated in FIG. 5. Accordingly, the luminance values on the x-axis are extended from an initial range, zero-to-$L_{Ref,Max}$ 508, to an extended range, $L_b$ 514- to $L_{t,Max}$ 516. For example, $L_b$ 514 corresponds to a background luminance as indicated by a luminance value. For example, with reference to FIG. 2, the light superposition characteristic values generator 208 determines a luminance value associated with the ambient light 202 based on ambient light data from the sensor subsystem 206. $L_{t,Max}$ 516 corresponds to the maximum luminance associated with the physical gamut resulting from the color correction 520. Accordingly, the color correction 520 increases the maximum luminance range from $L_{Ref,Max}$ 508 to $L_{t,Max}$ 516.

Figure 6:
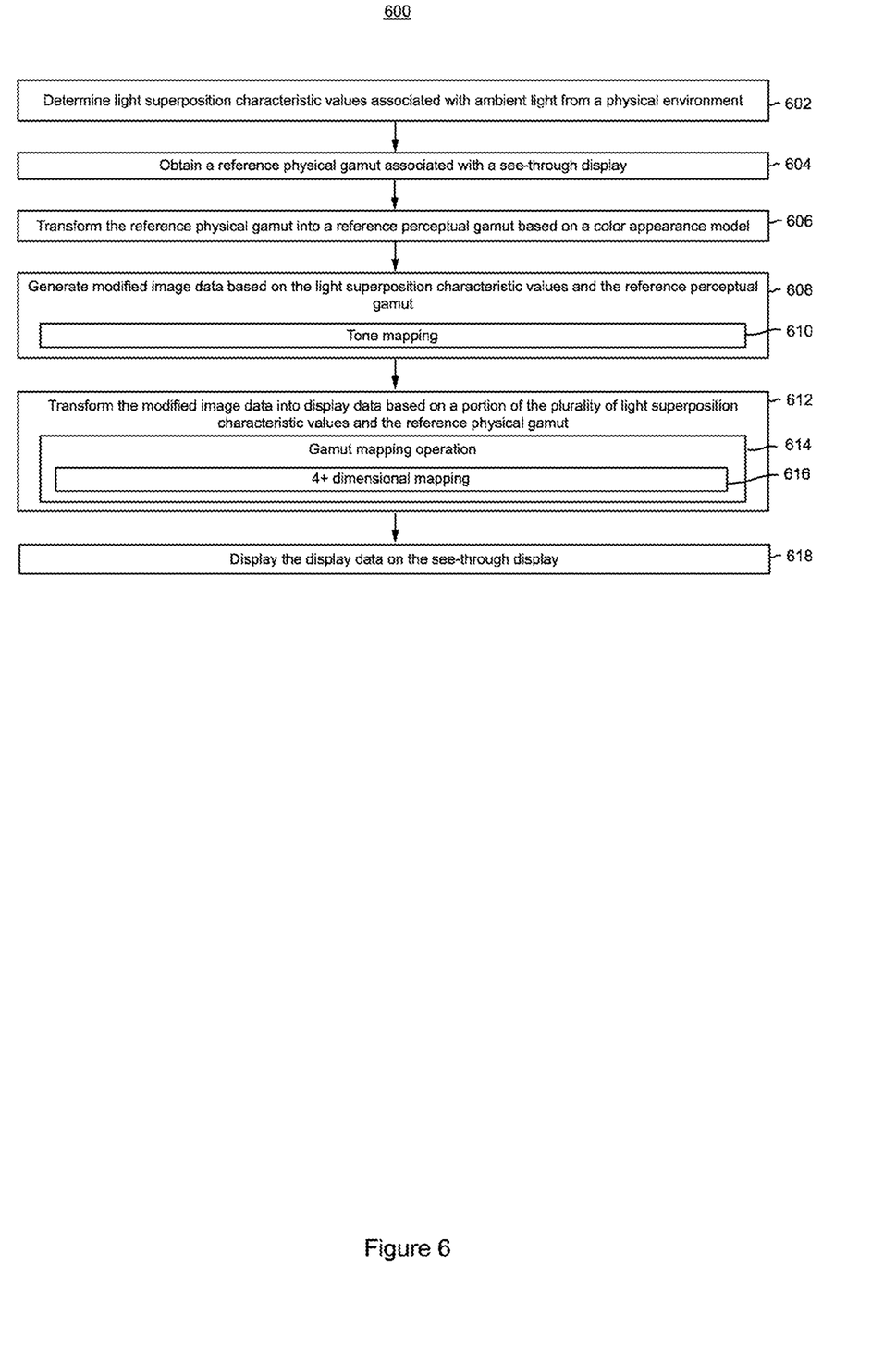
FIG. 6 is an example of a flow diagram of a method of modifying image data based on light superposition characteristic values and reference gamuts in accordance with some implementations.

FIG. 6 is an example of a flow diagram of a method 600 of modifying image data based on light superposition characteristic values and reference gamuts in accordance with some implementations. In various implementations, the method 600 or portions thereof are performed by an electronic device including a see-through display (e.g., the electronic device 100 in FIG. 1). In various implementations, the method 600 or portions thereof are performed by a color correction pipeline, such as one of the color correction pipeline 200 in FIG. 2, the color correction pipeline 300 in FIG. 3, or the semantic-based color correction pipeline 400 in FIG. 4. In various implementations, the method 600 or portions thereof are performed by a head-mountable device (HMD) including a see-through display (e.g., the see-through display 270 in FIGS. 2-4). In some implementations, the method 600 is performed by processing logic, including hardware, firmware, software, or a combination thereof. In some implementations, the method 600 is performed by a processor executing code stored in a non-transitory computer-readable medium (e.g., a memory).

As represented by block 602, the method 600 includes determining a plurality of light superposition characteristic values associated with ambient light from a physical environment. The plurality of light superposition characteristic values quantifies the ambient light. For example, with reference to FIG. 2, the light superposition characteristic values generator 208 determines the plurality of light superposition characteristic values associated with the ambient light 202. To that end, in some implementations, an electronic device includes an environmental sensor that senses the ambient light and outputs corresponding sensor data. For example, with reference to FIG. 2, the light superposition characteristic values generator 208 determines the plurality of light superposition characteristic values based on ambient light data from the sensor subsystem 206. As one example, the environmental sensor includes one or more of an ambient light sensor, image sensor, visual inertial odometry (VIO), inertial measurement unit (IMU), and/or the like.

As represented by block 604, in some implementations, the method 600 includes obtaining a reference physical gamut that is associated with the see-through display. For example, with reference to FIG. 2, the color correction pipeline 200 obtains the reference physical gamut associated with the see-through display 270 and stores the reference physical gamut in the reference physical gamut datastore 210. In some implementations, the reference physical gamut characterizes the see-through display as a nominal amount of ambient light from the physical environment enters the see-through display. In some implementations, the reference physical gamut indicates a first set of colors that is displayable on the see-through display. For example, the reference physical gamut indicates the colors range that the see-though display can display when there is a nominal amount of ambient light. As another example, the reference physical gamut corresponds to one of an RGB gamut or a P3 gamut.

As represented by block 606, in some implementations, the method 600 transforming the reference physical gamut into a reference perceptual gamut based on a function of a color appearance model. For example, with reference to FIG. 2, the first gamut mapper 220 transforms the reference physical gamut into the reference perceptual gamut. As one example, the reference perceptual gamut indicates a second set of colors, which may be different from the first set of colors that is displayable on the see-through display. A color appearance model may provide perceptual aspects of human color vision, such as the extent to which viewing conditions of a color diverge from the corresponding physical measurement of the stimulus source. For example, the color appearance model is associated with a CIELAB color space. In some implementations, the reference perceptual gamut indicates a range of colors that is perceptible by a particular user, which is affected by factors such as the user's state of adaptation of the eye, size and contour sharpness, location on the retina, etc. In some implementations, the reference physical gamut is associated with luminance, whereas the reference perceptual gamut is associated with lightness, such as is described with reference to FIG. 5.

As represented by block 608, the method 600 includes modifying image data in order to generate modified image data, based on a function of the plurality of light superposition characteristic values and the reference perceptual gamut. For example, with reference to FIG. 2, the image data modifier 240 modifies the image data 250 based on a function of the reference perceptual gamut 230 and the plurality of light superposition characteristic values from the light superposition characteristic values generator 208. In some implementations, modifying the image data includes mapping the image data to the reference perceptual gamut within a performance threshold, based on the plurality of light superposition characteristic values. For example, the performance threshold is a function of distortion level (e.g., minimal distortion in color or contrast), quality of color reproduction, user experience, and/or the like. As represented by block 610, in some implementations, modifying the image data includes applying a tone mapping operation to the image data. For example, the tonal mapping operation recovers contrast that is lost in a physical environment with a non-zero luminance value. For example, with reference to FIG. 2, the tone mapper 245 performs the tone mapping operation. In some implementations, the tone mapping operation corresponds to a high-dynamic range (HDR) tone mapping operation.

As represented by block 612, the method 600 includes transforming the modified image data into display data based on a function of a portion of the plurality of light superposition characteristic values and the reference physical gamut. The display data is displayed on the see-through display 270. As represented by block 614, in some implementations, transforming the modified image data includes applying a gamut mapping operation to the modified image data. For example, with reference to FIG. 2, the second gamut mapper 260 transforms modified image data to display data based on the reference physical gamut 210 and a portion of the plurality of light superposition characteristic values from the light superposition characteristic values generator 208. As represented by block 616, in some implementations, the gamut mapping operation represents at least a four-dimensional space. For example, a 6-dimensional gamut mapping operation is a function of three-dimensions associated with mapping image data to the see-through display (e.g., RGB-to-RGB), and an additional three-dimensions associated with chromaticity values (of the plurality of light superposition characteristic values) associated with ambient light from a physical environment. As one example, with reference to FIG. 2, the second gamut mapper 260 obtains the portion of the plurality of light superposition characteristic values from the plurality of light superposition characteristic values from the light superposition characteristic values generator 208. Accordingly, color correction techniques disclosed herein may include more than three-dimensional for gamut mapping, as compared with other systems that perform three-dimensional mapping from image data to display data.

As represented by block 618, the method 600 includes displaying the display data on the see-through display, such as on the see-through display 270 in FIG. 2.

Figure 7:
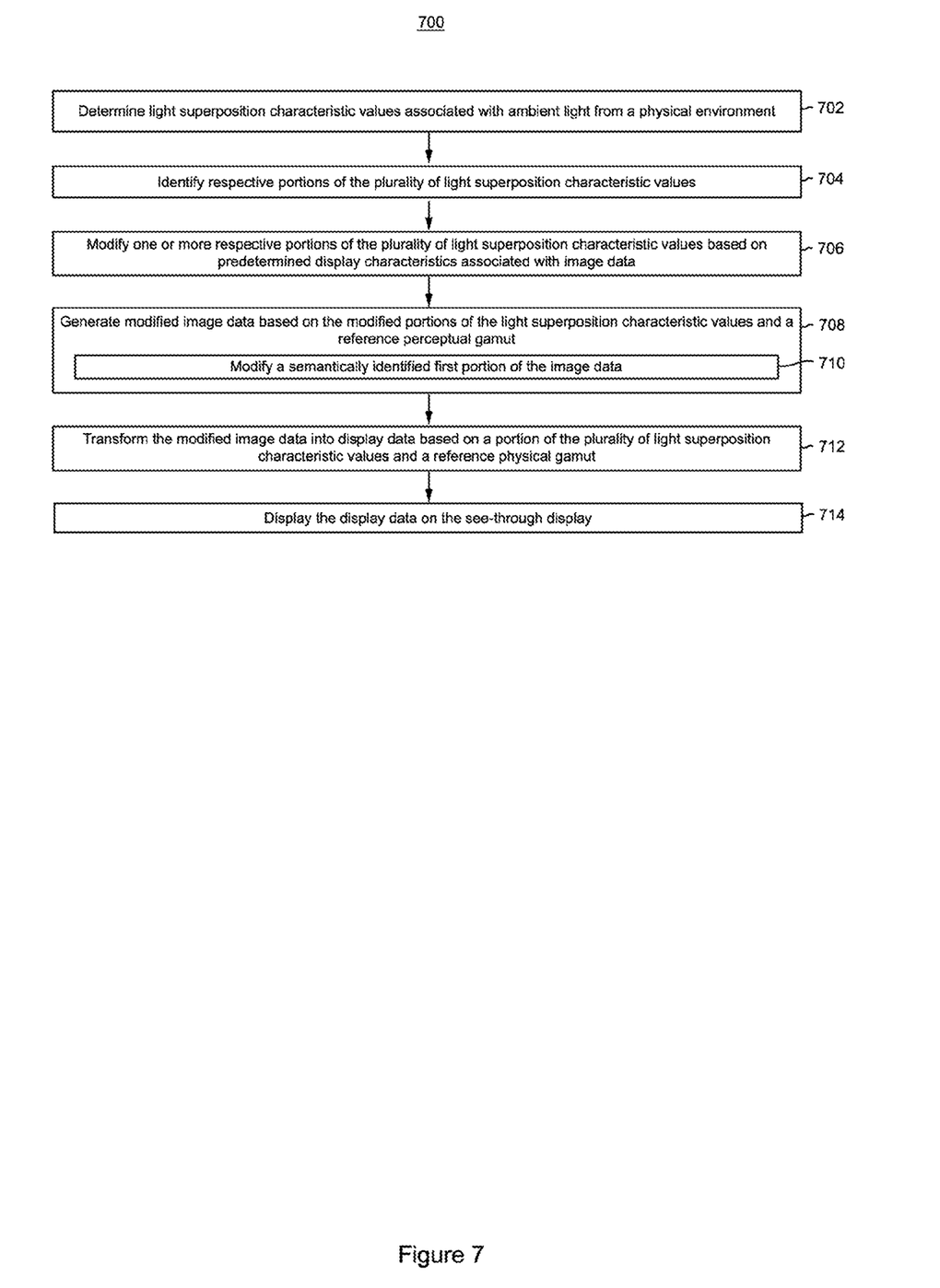
FIG. 7 is an example of a flow diagram of a method of selectively modifying a portion of image data based on light superposition characteristic values and reference gamuts in accordance with some implementations.

FIG. 7 is an example of a flow diagram of a method 700 of selectively modifying a portion of image data based on light superposition characteristic values and reference gamuts in accordance with some implementations. In various implementations, the method 700 or portions thereof are performed by an electronic device including a see-through display (e.g., the electronic device 100 in FIG. 1). In various implementations, the method 700 or portions thereof are performed by a color correction pipeline, such as one of the color correction pipeline 200 in FIG. 2, the color correction pipeline 300 in FIG. 3, or the semantic-based color correction pipeline 400 in FIG. 4. In various implementations, the method 700 or portions thereof are performed by a head-mountable device (HMD) including a see-through display (e.g., the see-through display 270 in FIGS. 2-4). In some implementations, the method 700 is performed by processing logic, including hardware, firmware, software, or a combination thereof. In some implementations, the method 700 is performed by a processor executing code stored in a non-transitory computer-readable medium (e.g., a memory).

As represented by block 702, the method 700 includes determining a plurality of light superposition characteristic values associated with ambient light from a physical environment. The plurality of light superposition characteristic values quantifies the ambient light. For example, with reference to FIG. 3, the light superposition characteristic values generator 208 determines the plurality of light superposition characteristic values associated with the ambient light 202 based on sensor data from the sensor subsystem 206.

As represented by block 704, in some implementations, the method 700 includes identifying respective portions of the plurality of light superposition characteristic values, across the see-though display, based on corresponding portions of image data. For example, with reference to FIG. 3, the light superposition characteristic value identifier 302 identifies the respective portions of the plurality of light superposition characteristic values. In some implementations, the light superposition characteristic value identifier 302 utilizes depth data from the depth sensor 150 in order to identify the respective portions of the plurality of light superposition characteristic values. For example, based on the depth data associated with the physical environment, the light superposition characteristic value identifier 302 identifies a portion of the ambient light 202 that is associated with foreground objects (e.g., objects associated with relatively low depth values) within the physical environment.

As represented by block 706, in some implementations, the method 700 includes modifying (e.g., preprocessing) one or more of the respective portions of the plurality of light superposition characteristic values based on a function of predetermined display characteristics associated with the image data, in order to generate one or more modified portions of the plurality of light superposition characteristic values. The predetermined display characteristics may include a combination of chromaticity values and lightness value associated with the image data. For example, with reference to FIG. 3, the light superposition characteristic value modifier 310 modifies identified respective portions of the plurality of light superposition characteristic values. In some implementations, the light superposition characteristic value modifier 310 applies a uniform luminance function 312 to the one or more of the respective portions of the plurality of light superposition characteristic values. For example, if a portion of the image data represents a face, the light superposition characteristic value modifier 310 applies the uniform luminance function 312 to a corresponding portion of the light superposition characteristic values in order to achieve a substantially uniform skin tone. In some implementations, the light superposition characteristic value modifier 310 applies a luminance smoothing function 314 to the one or more of the respective portions of the plurality of light superposition characteristic values. For example, the luminance smoothing function 314 includes one of a Gaussian smoothing, uniform moving average smoothing, etc.

As represented by block 708, in some implementations, the method 700 includes generating, from the image data, modified image data based on the one or more modified portions of the plurality of light superposition characteristic values and a reference perceptual gamut. For example, with reference to FIG. 3, the image data modifier 320 modifies the image data based on the output from the light superposition characteristic value modifier 310 and the output from the reference perceptual gamut datastore 230.

As represented by block 710, in some implementations, generating the modified image data includes modifying a semantically identified first portion of the image data. To that end, in some implementations, the method 700 includes obtaining a plurality of semantic values respectively associated with a plurality of portions within the image data. The plurality of portions includes a first portion of the image data and a second portion of the image data. For example, with reference to FIG. 4, the semantic values generator 410 generates the plurality of semantic values, such as "wall", "face", "table", etc. Moreover, the method 700 includes identifying a first one of the plurality of semantic values that satisfies a criterion. The first one of the plurality of semantic values is associated with the first portion of the image data. For example, with reference to FIG. 4, the semantic value identifier 420 identifies the first one of the plurality of semantic values that satisfies the criterion. In some implementations, the first one of the plurality of semantic values corresponds to an object of interest, such as a "face" of a person that is represented within the image data. Moreover, the method 700 includes modifying the first portion of the image data, such as via the scene object modifier 432 and/or the scene background modifier 434 described with reference to FIG. 4. Accordingly, by selectively modifying a portion of the image data without modifying the entirety of the image data, the semantic-based color correction pipeline 400 reduces resource utilization in some circumstances.

As represented by block 712, the method 700 includes transforming the modified image data into display data based on a function of a portion of the plurality of light superposition characteristic values and the reference physical gamut. For example, with reference to FIGS. 3 and 4, the second gamut mapper 260 transforms modified image data to display data based on the reference physical gamut 210 and a portion of the plurality of light superposition characteristic values from the light superposition characteristic values generator 208.

As represented by block 714, the method 700 includes displaying the display data on the see-through display, such as the see-through display 270 in FIG. 3 or FIG. 4.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed:

1. A method comprising:
   at an electronic device including one or more processors, a non-transitory memory, and a see-through display:
   determining a plurality of light superposition characteristic values associated with ambient light from a physical environment, wherein the plurality of light superposition characteristic values quantifies the ambient light;
   modifying image data in order to generate modified image data, based on a function of the plurality of light superposition characteristic values and a reference perceptual gamut;
   transforming the modified image data into display data based on a function of a portion of the plurality of light superposition characteristic values and a reference physical gamut that is associated with the see-through display, wherein the reference physical gamut characterizes the see-through display as a nominal amount of ambient light from the physical environment enters the see-through display; and
   displaying the display data on the see-through display.

2. The method of claim 1, wherein modifying the image data includes mapping the image data to the reference perceptual gamut within a performance threshold, based on the plurality of light superposition characteristic values.

3. The method of claim 1, wherein the reference physical gamut indicates a first set of colors that is displayable on the see-through display, and wherein the reference perceptual gamut indicates a second set of colors.

4. The method of claim 1, further comprising transforming the reference physical gamut into the reference perceptual gamut based on a function of a color appearance model.

5. The method of claim 1, wherein modifying the image data includes applying a tone mapping operation to the image data.

6. The method of claim 5, wherein the tone mapping operation corresponds to a high-dynamic range (HDR) tone mapping operation.

7. The method of claim 1, wherein transforming the modified image data into the display data includes applying a gamut mapping operation to the modified image data, wherein the gamut mapping operation is a function of the portion of the plurality of light superposition characteristic values and the reference physical gamut.

8. The method of claim 7, wherein the gamut mapping operation represents at least a four-dimensional space.

9. The method of claim 1, further comprising:
   obtaining a plurality of semantic values respectively associated with a plurality of portions within the image data, wherein the plurality of portions includes a first portion of the image data and a second portion of the image data; and
   identifying a first one of the plurality of semantic values that satisfies a criterion, wherein the first one of the plurality of semantic values is associated with the first portion of the image data;
   wherein modifying the image data is a further function of predetermined display characteristics associated with the first portion of the image data.

10. The method of claim 1, further comprising:
    identifying respective portions of the plurality of light superposition characteristic values, across the see-through display, based on corresponding portions of the image data; and
    modifying one or more of the respective portions of the plurality of light superposition characteristic values based on a function of predetermined display characteristics associated with the image data in order to generate one or more modified portions of the plurality of light superposition characteristic values;
    wherein generating the modified image data is based on the one or more modified portions of the plurality of light superposition characteristic values.

11. The method of claim 1, wherein the electronic device includes an environmental sensor that senses the ambient light and outputs corresponding sensor data, wherein determining the plurality of light superposition characteristic values is based on a function of the sensor data.

12. A color correction pipeline comprising:
    a light superposition characteristic values generator to determine a plurality of light superposition characteristic values associated with ambient light from a physical environment, wherein the plurality of light superposition characteristic values quantifies the ambient light;
    an image data modifier to modify image data in order to generate modified image data, based on a function of the plurality of light superposition characteristic values and a reference perceptual gamut;
    a second gamut mapper to transform the modified image data into display data based on a function of a portion of the plurality of light superposition characteristic values and a reference physical gamut; and
    a see-through display to display the display data, wherein the reference physical gamut is associated with the see-through display, wherein the reference physical gamut characterizes the see-through display as a nominal amount of ambient light from the physical environment enters the see-through display.

13. The color correction pipeline of claim 12, further comprising a first gamut mapper to transform the reference physical gamut into the reference perceptual gamut based on a function of a color appearance model.

14. The color correction pipeline of claim 12, wherein the second gamut mapper transforms the modified image data by applying a gamut mapping operation to the modified image data, wherein the gamut mapping operation is a function of the portion of the plurality of light superposition characteristic values and the reference physical gamut.

15. The color correction pipeline of claim 14, wherein the gamut mapping operation represents at least a four-dimensional space.

16. The color correction pipeline of claim 12, further comprising:
a semantic value generator to obtain a plurality of semantic values respectively associated with a plurality of portions within the image data, wherein the plurality of portions includes a first portion of the image data and a second portion of the image data; and
a semantic value identifier to identify a first one of the plurality of semantic values that satisfies a criterion, wherein the first one of the plurality of semantic values is associated with the first portion of the image data;
wherein the image data modifier modifies the image data based on a function of predetermined display characteristics associated with the first portion of the image data.

17. The color correction pipeline of claim 12, further comprising:
a light superposition characteristic value identifier to identify respective portions of the plurality of light superposition characteristic values, across the see-through display, based on corresponding portions of the image data; and
a light superposition characteristic value modifier to modify one or more of the respective portions of the plurality of light superposition characteristic values based on a function of predetermined display characteristics associated with the image data in order to generate one or more modified portions of the plurality of light superposition characteristic values;
wherein the image data modifier modifies the image data based on the one or more modified portions of the plurality of light superposition characteristic values.

18. The color correction pipeline of claim 17, further comprising a depth sensor that outputs depth data, wherein the light superposition characteristic value identifier identifies the respective portions of the plurality of light superposition characteristic values based on the depth data.

19. A non-transitory computer readable storage medium storing one or more programs, the one or more programs comprising instructions, which, when executed by an electronic device with one or processors and a see-through display, cause the electronic device to:
determine a plurality of light superposition characteristic values associated with ambient light from a physical environment, wherein the plurality of light superposition characteristic values quantifies the ambient light;
modify image data in order to generate modified image data, based on a function of the plurality of light superposition characteristic values and a reference perceptual gamut;
transform the modified image data into display data based on a function of a portion of the plurality of light superposition characteristic values and a reference physical gamut that is associated with the see-through display, wherein the reference physical gamut characterizes the see-through display as a nominal amount of ambient light from the physical environment enters the see-through display; and
display the display data on the see-through display.

* * * * *